United States Patent
Burky et al.

(10) Patent No.: US 6,430,680 B1
(45) Date of Patent: Aug. 6, 2002

(54) PROCESSOR AND METHOD OF PREFETCHING DATA BASED UPON A DETECTED STRIDE

(75) Inventors: William Elton Burky, Austin; David Andrew Schroter, Round Rock; Shih-Hsiung Stephen Tung; Michael Thomas Vaden, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/052,567

(22) Filed: Mar. 31, 1998

(51) Int. Cl.[7] .................................................. G06F 9/00
(52) U.S. Cl. ........................ 712/225; 712/241; 711/137; 711/213
(58) Field of Search .................................... 712/225, 241; 711/137, 213

(56) References Cited

U.S. PATENT DOCUMENTS

| | | | |
|---|---|---|---|
| 4,918,587 A | * 4/1990 | Pechter et al. ................ | 711/218 |
| 5,588,128 A | * 12/1996 | Hicok et al. ................. | 711/204 |
| 5,694,568 A | * 12/1997 | Harrison, III et al. ....... | 711/213 |
| 5,802,566 A | * 9/1998 | Hagersten .................... | 711/137 |
| 5,953,512 A | * 9/1999 | Cai et al. ..................... | 712/205 |
| 6,138,212 A | * 10/2000 | Chiacchia et al. ........... | 712/207 |

OTHER PUBLICATIONS

Kim, Sunil et al., Stride–directed Prefetching for Secondary Caches, IEEE, 1997, pp. 314–321.*

Fu, John W. C., Stride Directed Prefetching in Scalar Processors, IEEE 1992, pp. 102–110.*

Dahlgren, Fredrik et al., Effectiveness of Hardware–Based Stride and Sequential Prefetching in Shared–Memory Multiprocessors, IEEE 1995, pp. 68–77.*

\* cited by examiner

*Primary Examiner*—Richard L. Ellis
(74) *Attorney, Agent, or Firm*—Robert M. Carwell; Bracewell & Patterson, L.L.P.

(57) ABSTRACT

A processor and method of fetching data within a data processing system are disclosed. According to the method, a first difference between a first load address and a second load address is calculated. In addition, a determination is made whether a second difference between a third load address and the second load address is equal to the first difference. In response to a determination that the first difference and the second difference are equal, a fourth load address, which is generated by adding the third address and the second difference, is transmitted to the memory as a memory fetch address. In an embodiment of the data processing system including a processor having an associated cache, the fourth load address is transmitted to the memory only if the fourth load address is not resident in the cache or the target of an outstanding memory fetch request.

16 Claims, 3 Drawing Sheets

PROCESSOR AND METHOD OF PREFETCHING DATA BASED UPON A DETECTED STRIDE

BACKGROUND OF THE INVENTION

1. Technical Field

The present invention relates in general to data processing and, in particular, to a processor and method for fetching data from memory. Still more particularly, the present invention relates to a processor and method for prefetching data from memory based upon a detected stride.

2. Description of the Related Art

As processor clock frequencies have continued to increase, thereby permitting increased instruction throughput, memory latency has become a principal impediment to improved processor performance. Although instructions are commonly speculatively fetched from memory in order to ameliorate the effects of instruction access latency, in a conventional processor data is fetched from memory only after a load instruction has been executed to determine the address of the data to be fetched (i.e., only demand fetching is used).

The present invention includes a recognition that in order to reduce data access latency, it is desirable to intelligently prefetch data from memory.

SUMMARY OF THE INVENTION

It is therefore one object of the present invention to provide an improved method and system for data processing.

It is another object of the present invention to provide an improved processor and method for fetching data from memory.

It is yet another object of the present invention to provide a processor and method for prefetching data from memory based upon a detected stride.

The foregoing objects are achieved as is now described. According to the method of the present invention, a first difference between a first load address and a second load address is calculated. In addition, a determination is made whether a second difference between a third load address and the second load address is equal to the first difference. In response to a determination that the first difference and the second difference are equal, a fourth load address, which is generated by adding the third address and the second difference, is transmitted to the memory as a memory fetch address. In an embodiment of the data processing system including a processor having an associated cache, the fourth load address is transmitted to the memory only if the fourth load address is not resident in the cache or the target of an outstanding memory fetch request. The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
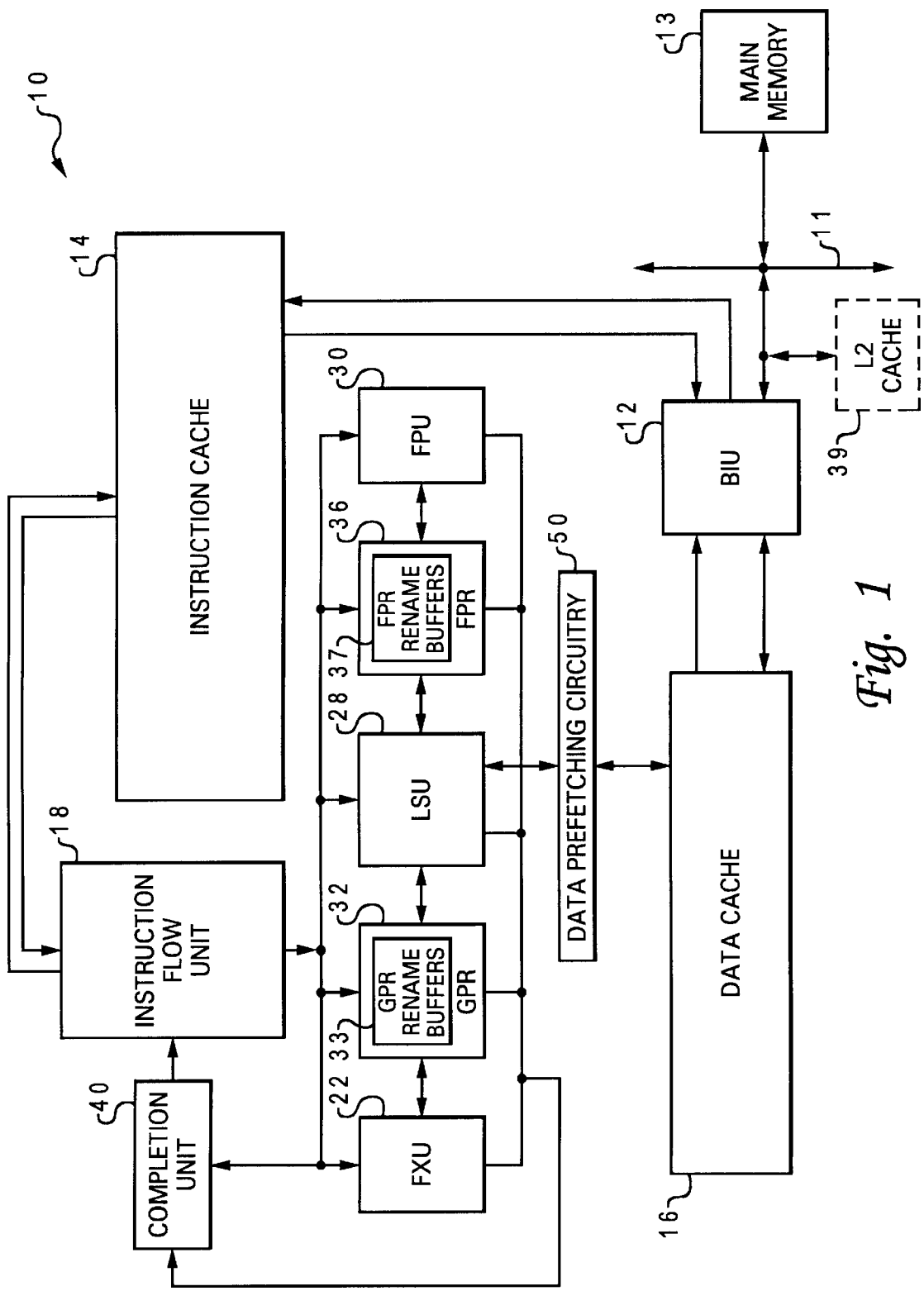
FIG. 1 depicts an illustrative embodiment of a data processing system in which the present invention may advantageously be utilized.

With reference now to the figures and in particular with reference to FIG. 1, there is depicted a block diagram of an illustrative embodiment of a processor, indicated generally at 10, for processing data and instructions in accordance with the invention recited in the appended claims. In the depicted illustrative embodiment, processor 10 comprises a single integrated circuit superscalar microprocessor. Accordingly, as discussed further below, processor 10 includes various execution units, registers, buffers, memories, and other functional units, which are all formed by integrated circuitry. Processor 10 preferably comprises one of the PowerPC™ line of microprocessors available from IBM Microelectronics, which operates according to reduced instruction set computing (RISC) techniques; however, those skilled in the art will appreciate from the following description that the present invention may alternatively be implemented in other suitable processors or memory devices.

As illustrated in FIG. 1, processor 10 is coupled to a processor bus 11 via a bus interface unit (BIU) 12 within processor 10. BIU 12 controls the transfer of data and instructions between processor 10 and devices coupled to processor 10, such as optional level two (L2) cache 39 and main memory 13. Processor 10, optional L2 cache 39, processor bus 11, and the devices coupled to processor bus 11 together form a data processing system.

BIU 12 is connected to instruction cache 14 and data cache 16 within processor 10. Upper level caches, such as instruction cache 14 and data cache 16, enable processor 10 to achieve relatively fast access time to a subset of data or instructions previously transferred from L2 cache 39 or main memory 13 to the caches, thus improving the speed of operation of the data processing system. Instruction cache 14 is further coupled to instruction flow unit 18, which fetches instructions from instruction cache 14. Branch instructions fetched from instruction cache 14 are processed by branch processing circuitry internal to instruction flow unit 18; sequential instructions, on the other hand, are temporarily buffered within instruction flow unit 18 until they are dispatched to the sequential execution circuitry of processor 10.

In the depicted illustrative embodiment, the sequential execution circuitry of processor 10 includes fixed-point unit (FXU) 22, load-store unit (LSU) 28, and floating-point unit (FPU) 30. Each of execution units 22, 28, and 30 typically executes one or more instructions of a particular type of sequential instructions during each processor cycle. For example, FXU 22 performs integer mathematical and logical operations such as addition, subtraction, ANDing, Oring, and XORing, utilizing integer source operands received from specified general purpose registers (GPRs) 32 or GPR rename buffers 33. Following the execution of an instruction, FXU 22 outputs the resulting data, if any, to GPR rename buffers 33, which provide temporary storage for the result data until the instruction is completed under the direction of completion unit 40 by transferring the result data from GPR rename buffers 33 to one or more of GPRs 32. FPU 30, on the other hand, typically performs arithmetic and logical operations, such as multiplication and division, on single and double-precision floating-point source operands received from floating-point registers (FPRs) 36 or FPR rename buffers 37. FPU 30 outputs data resulting from the execution of floating-point instructions to selected FPR rename buffers 37, which temporarily store the result data until the instructions are completed under the direction of completion unit 40 by transferring the result data from FPR rename buffers 37 to selected FPRs 36.

As its name implies, LSU 28 typically executes floating-point and fixed-point instructions that either load data from memory (i.e., either data cache 16, L2 cache 39, or main memory 13) into selected GPRs 32 or FPRs 36 or that store data from a selected one of GPRs 32, GPR rename buffers 33, FPRs 36, or FPR rename buffers 37 to memory. As discussed further below with respect to FIGS. 2 and 3, load addresses computed by LSU 28 are examined by data prefetching circuitry 50 in order to determine whether a repeated stride exists. If so, a load address can be generated by data prefetching circuitry 50 based on the detected stride, and the load address can be transmitted to memory to initiate data prefetching.

Processor 10 preferably employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by processor 10 at a sequence of pipeline stages, including, for example, fetch, decode/dispatch, execute, finish, and completion.

Figure 2:
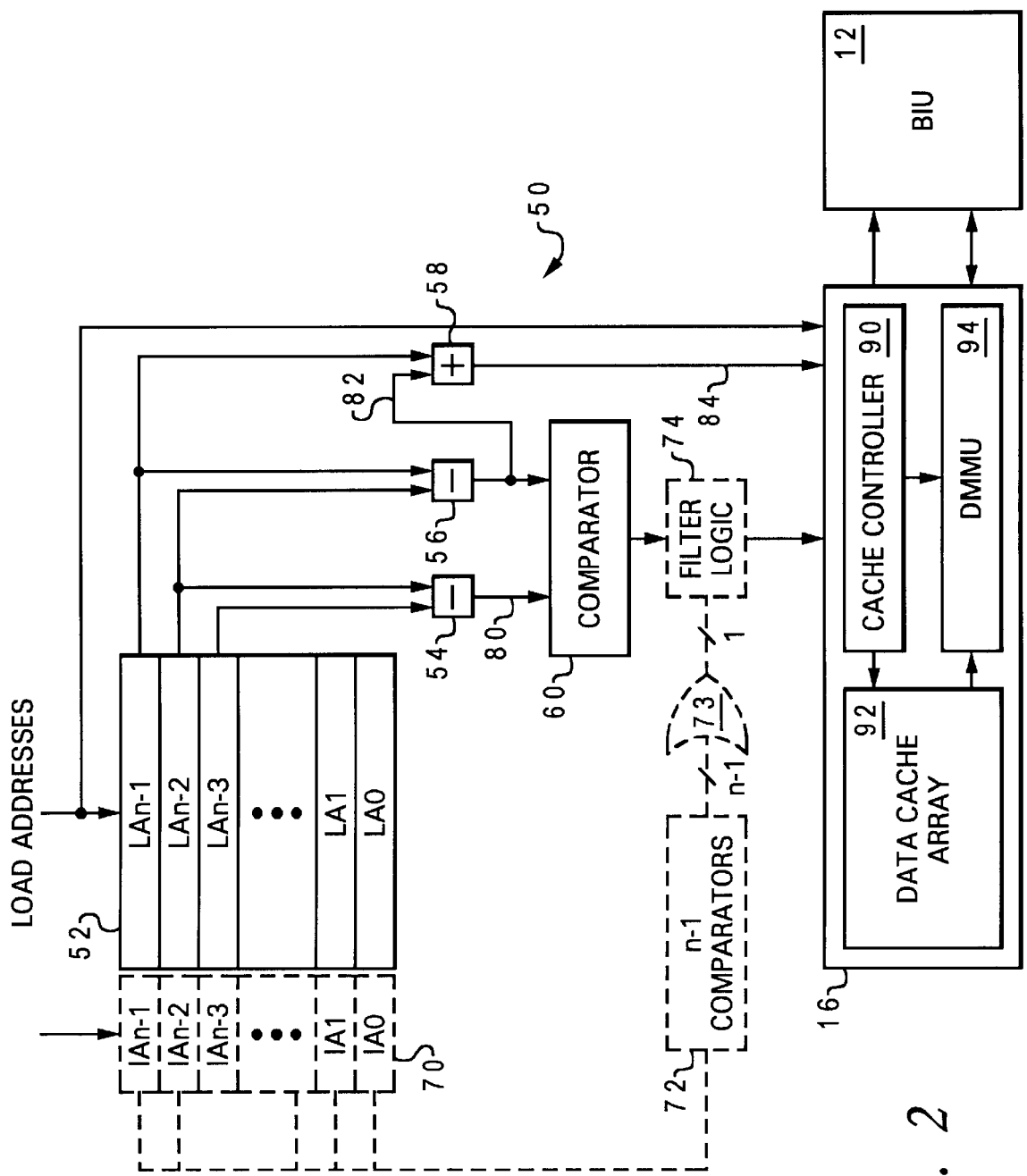
FIG. 2 is a block diagram of an illustrative embodiment of data prefetch circuitry in accordance with the present invention.

Referring now to FIG. 2, there is illustrated a more detailed block diagram of the data prefetching circuitry within processor 10 of FIG. 1. Data prefetching circuitry, indicated generally at reference numeral 50, includes an n-entry load address queue 52, subtractors 54 and 56, adder 58, and comparator 60. In addition, as indicated by dashed-line illustration, data prefetching circuitry 50 may optionally include loop detection circuitry, including n-entry instruction address queue 70, comparators 72, OR gate 73, and filter logic 74.

As depicted, each load address resulting from the execution of a load instruction by LSU 28 is passed to data cache 16 and is stored in the top entry (LAn-1) of load address queue 52. Load address queue 52 is preferably a first in, first out (FIFO) queue that shifts load addresses down in the queue in response to the addition of a new load address to the top of the queue. (The load address in entry LA0 is discarded.) Entries LAn-1 and LAn-2 of load address queue 52 are coupled to subtractor 56 such that the load addresses stored in these entries form the inputs of subtractor 56. Similarly, entries LAn-2 and LAn-3 are coupled to subtractor 54 such that the load addresses stored within these entries provide the inputs of subtractor 54. Subtractors 54 and 56, which are each preferably implemented as an adder having an inverting input, calculate differences 80 and 82, which represent the relative difference between the load addresses in entries LAn-3 and LAn-2 and the difference between the load addresses in entries LAn-2 and LAn-1, respectively. Differences 80 and 82 form the inputs of comparator 60, which generates an equal signal if differences 80 and 82 are equal and otherwise outputs a not equal signal. The generation of an equal signal by comparator 60 indicates that a stride between load addresses has been detected.

Adder 58 is coupled to entry LAn-1 of load address queue 52 and to the output of subtractor 56 so that adder 58 receives the most recently received load address and difference 82 as inputs. Adder 58 sums these inputs to generate a load address 84 having a difference with the load address in entry LAn-1 equal to difference 82. Load address 84 is then sent to data cache 16. In an embodiment of data prefetching circuitry 50 in which filter logic 74 is omitted, cache controller 90 of data cache 16 receives the equal/not equal signal output by comparator 60 and utilizes this signal to determine whether or not load address 84 should be interpreted as a memory request address. Thus, in cases in which load address 84 is qualified by an equal signal, indicating that a stride has been detected, cache controller 90 handles load address 84 like the load addresses received from LSU 28. Conversely, when cache controller 90 receives a not equal signal, load address 84 is ignored.

In some data processing systems, for example, those primarily utilized to execute scientific applications characterized by looping code, it may be desirable to further qualify the equal signal generated by comparator 60. In one embodiment, such qualification can be achieved by employing additional subtractors to verify that the stride is observed over additional loads. In addition, data prefetching circuitry 50 can optionally be augmented to include loop detection circuitry, including instruction address queue 70, comparators 72, OR gate 73, and filter logic 74 as illustrated in FIG. 2. Instruction address queue 70 is a FIFO queue including n entries that each store at least a portion of an instruction address of a load instruction executed to generate the load address stored in the associated entry of load address queue 52. Each of the instruction address portions stored in entries IA0 through IAn-2 of instruction address queue 70 forms a first input of a respective one of the n−1 comparators 72. The second input of each of the n−1 comparators 72 is the instruction address portion stored within entry IAn-1, i.e., the most recently received instruction address. Comparators 72 output n−1 signals indicating which, if any, of the instruction address portions stored in instruction address queue 70 match the instruction address portion stored within entry IAn-1. OR gate 73 receives each of the n−1 signals output by comparators 72 and performs a logical OR operation to generate a one-bit output that indicates whether the instruction address portion stored within entry IAn-1 matches any of the other instruction address portions stored within instruction address queue 70. The one-bit output of OR gate 73 is received as an input by filter logic 74, which may comprise, for example, a two-input AND gate. Based upon the logic states of the outputs of OR gate 73 and comparator 60, filter logic 74 outputs a valid signal to data cache 16 indicating whether load address 84 should be interpreted as a memory request address. In this manner, instruction address queue 70, comparators 72, OR gate 73, and filter logic 74 further qualify the output of comparator 60 by requiring that a program loop (i.e., a matching load instruction address) be detected before data prefetching is initiated.

As discussed above, if data cache 16 does not receive an equal signal from comparator 60 or a valid signal from filter logic 74, load address 84, if computed, is simply ignored. Alternatively, if data cache 16 receives both a load address 84 and an enable signal, data cache 16 handles load address 84 like any other load address received from LSU 28. That is, cache controller 90 determines whether data associated with the load address is resident in data cache array 92 or if the load address is the subject of an outstanding memory request. If either of these conditions is true, cache controller 90 discards load address 84. However, if load address 84 misses in data cache array 92 and is not the subject of an outstanding memory request, cache controller 90 forwards load address 84, which preferably comprises an effective address, to data memory management unit (DMMU) 94 for translation to a real (physical) address. This real address is then passed to BIU 12, which transmits the real address as a memory request address to main memory 13 and/or L2 cache 39.

Figure 3:
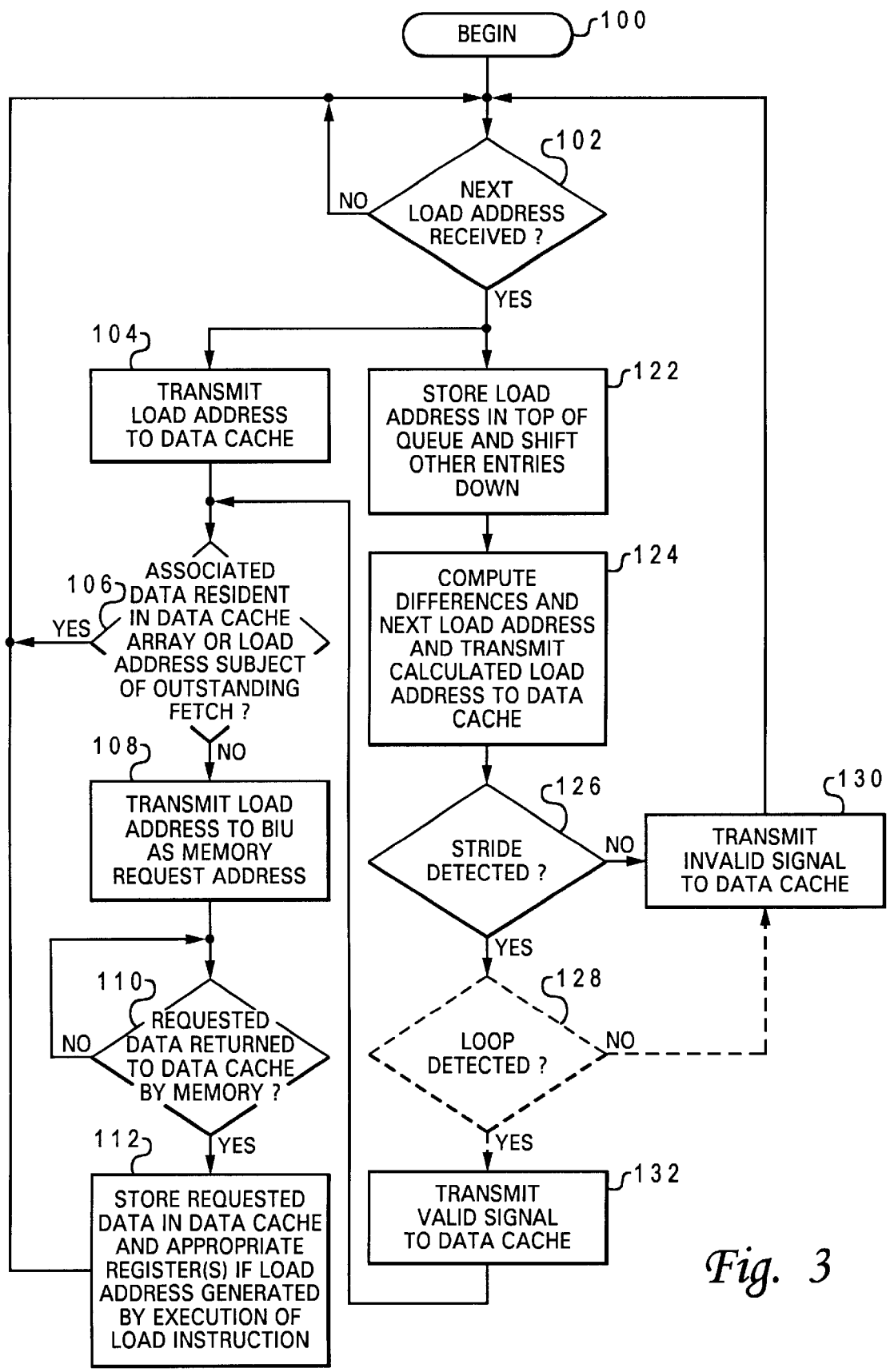
FIG. 3 is a logical flowchart illustrating an exemplary method for prefetching data in accordance with the present invention.

With reference now to FIG. 3, there is depicted a logical flowchart of an exemplary method for prefetching data in accordance with the present invention. As illustrated, the process begins at block 100 and thereafter proceeds to block 102, which illustrates a determination of whether or not data prefetching circuitry 50 has received a next load address from LSU 28. If not, the process simply iterates at block 102 until a next load address is received from LSU 28. In response to receipt of the next load address from LSU 28, the load address is both transmitted to data cache 16 and stored in the top entry (LAn-1) of load address queue 52, as indicated at blocks 104 and 122, respectively.

As depicted at block 106, in response to receipt of the load address generated by LSU 28, cache controller 90 of data cache 16 determines whether or not data associated with the load address is resident in data cache array 92 or if the load address is the subject of an outstanding memory request (e.g., whether another data fetch will supply a cache line containing data associated with the load address). If either of these conditions is true, then data cache 90 performs no further processing on the load address, and the process returns to block 102. However, if both the conditions tested at block 106 are false, the process proceeds to block 108. Block 108 illustrates data cache 16 transmitting the load address to BIU 12, preferably after translating the load address into a real address. In response to receipt of the real address, BIU 12 transmits the real address to memory as a memory request address. The process then iterates at block 110 until data associated with the memory request address is returned to data cache 16 from memory, typically in the form of a cache line of data including the data associated with the load address. In response to receipt of the requested data, cache controller 90 stores the requested data within data cache array 92, as shown at block 112. In addition, if the load address utilized to obtain the memory request address was generated by LSU 28 (as opposed to data prefetching circuitry 50), selected data within the received cache line is passed to LSU 28 for storage within the GPRs 32 or FPRs 36 specified by the load instruction. Thereafter, the process returns to block 102.

Referring again to block 122, following the storage of the load address within entry LAn-1 of load address queue 52, the process proceeds to block 124. Block 124 depicts data prefetching circuitry 50 computing differences 80 and 82 and load address 84 and transmitting load address 84 to data cache 16 as described above with respect to FIG. 2. The process then proceeds to block 126, which depicts a determination of whether or not a stride between load addresses was detected. If not, the process passes to block 130, which depicts comparator 60 transmitting an invalid (i.e., not equal) signal to data cache 16. Thereafter, the process returns to block 102.

However, in response to a determination at block 126 that a stride between load addresses has been detected, the process passes either to block 132, if the optional loop detection circuitry is not implemented within data prefetching circuitry 50, or to block 128, if the optional loop detection circuitry is implemented. Block 128 represents a determination of whether or not the signal produced by OR gate 73 indicates that a loop has been detected. If not, the process passes to block 130, which has been described. If, on the other hand, a loop has been detected, the process proceeds to block 132, which illustrates either comparator 60 or filter logic 74 transmitting a valid (or equal) signal to data cache 16 to indicate that load address 84 should be treated as a valid load address. The process then passes to blocks 106–112, which depict data cache 16 processing load address 84 in the manner described above.

As has been described, the present invention provides a method and system for intelligently prefetching data based upon a detected stride between load addresses. In one implementation, data prefetching can be further qualified by loop detection. By prefetching data from lower level memory prior to receipt of a request for the data from a processor or upper level memory, data latency can be substantially reduced.

While the invention has been particularly shown and described with reference to a preferred embodiment, it will be understood by those skilled in the art that various changes in form and detail may be made therein without departing from the spirit and scope of the invention. For example, although data prefetching circuitry 50 is illustrated in FIG. 2 as being distinct from LSU 28 and cache controller 90, it should be understood that in alternative embodiments data prefetching circuitry 50 can be incorporated within LSU 28 or within cache controller 90. Moreover, although the present invention has been described with respect to an illustrative embodiment in which a processor prefetches data from a lower level memory, it should be understood that data prefetching circuitry in accordance with the present invention is equally applicable to the prefetching of data by a lower level memory, such as L2 cache 39 prefetching data from main memory 13.

What is claimed is:

1. A method within a data processing system including a processor and a memory for generating a load address, said method comprising:

storing at least a portion of a first instruction address of a first load instruction;

determining a first difference between a first load target address and a second load target address;

determining a second difference between said second load target address and a third load target address, said third load target address having a second instruction address associated therewith;

generating a fourth load target address in response to comparing said first and second differences; and supplying said fourth load target address to the memory as a memory request address if a program loop is detected by comparison of said second instruction address and said at least said portion of said first instruction address, wherein said memory is an upper level memory and said data processing system further includes a lower level memory, said supplying step comprising transmitting said fourth load target address to said lower level memory only if data associated with said fourth load target address is neither resident in said upper level memory nor a target of an outstanding memory fetch request transmitted to said lower level memory.

2. The method of claim 1, wherein said first and second differences are equal and a third difference between said third load target address and said fourth load target address is equal to said first and second differences.

3. The method of claim 1, and further comprising:

executing one or more load instructions to compute said fist, second, and third load target addresses.

4. The method of claim 1, and further comprising storing at least said first and said second load target addresses in a load address queue.

5. The method of claim 1, wherein said supplying step comprises transmitting said fourth load target address from said processor to said memory as a memory request address.

6. The method of claim 1, wherein said supplying is performed only if a program loop is detected.

7. A data processing system, comprising:

an upper level memory and a lower level memory;

means for storing at least a portion of a first instruction address of a first load instruction;

means for determining a first difference between a first load target address and a second load target address;

means for determining a second difference between said second load target address and a third load target address, said third load target address having a second instruction address associated therewith;

means for generating a fourth load target address in response to comparing said first and second differences;

means for comparing said second instruction address and said at least said portion of said first instruction address to detect a program loop; and means for supplying said fourth load target address to the upper level memory as a memory request address if a program loop is detected, said means for supplying comprising means for transmitting said fourth load target address to said lower level memory only if data associated with said fourth load target address is neither resident in said upper level memory nor a target of an outstanding memory fetch request transmitted to said lower level memory.

8. The data processing system of claim 7, wherein said first and second differences are equal, said means for generating a fourth load target address comprising means for generating a fourth load target address such that a third difference between said third load target address and said fourth load target address is equal to said first and second differences.

9. The data processing system of claim 7, and further comprising means for executing one or more load instructions to compute said first, second, and third load target addresses.

10. The data processing system of claim 7, and further comprising means for storing said at least said first and second load target addresses.

11. The data processing system of claim 7, wherein said means for supplying comprises means for transmitting said fourth load target address from a processor to said memory as a memory request address.

12. The data processing system of claim 7, wherein said means for supplying supplies said fourth load target address to the memory as a memory request address only if a program loop is detected.

13. A processor having an associated upper level memory and a lower level memory, said processor comprising:

a load-store unit that executes one or more load instructions to produce at least first, second, and third load target addresses, wherein said third load address has a second instruction address associated therewith;

an instruction address queue that stores at least a portion of a first instruction address of an executed first load instruction;

a difference circuitry that determines a first difference between said first load target address and said second load target address and determines a second difference between said third load target address and said second load target address;

address generation circuitry that generates a fourth load target address in response to a comparison of said first and said second differences; and loop detection circuitry that compares said second instruction address and said at least said portion of said first instruction address to detect a program loop; and logic circuitry that supplies said fourth load target address to a memory as a memory request address if a program loop is detected by said loop detection circuitry, wherein said logic circuitry supplies said fourth load target address to said lower level memory only if data associated with said fourth load target address is neither resident in said upper level memory nor a target of an outstanding memory fetch request transmitted to said lower level memory.

14. The processor of claim 13, and further comprising a load target address queue capable of storing at least said first and second load target addresses.

15. The processor of claim 13, wherein said address generation circuitry generates said fourth load target address in response to said comparison indicating that said first difference and said second difference are equal.

16. The processor of claim 13, wherein said logic circuitry supplies said fourth load target address to the memory as a memory request address only if a program loop is detected.

* * * * *

UNITED STATES PATENT AND TRADEMARK OFFICE
CERTIFICATE OF CORRECTION

PATENT NO. : 6,430,680 B1
DATED : August 6, 2002
INVENTOR(S) : Burky et al.

It is certified that error appears in the above-identified patent and that said Letters Patent is hereby corrected as shown below:

<u>Column 6,</u>
Lines 66-67, replace "executing one or more load instructions to compute said fist, second and third load target addresses" with -- executing one or more load instructions to computer said first, second and third load target addresses. --

Signed and Sealed this

Eighteenth Day of February, 2003

JAMES E. ROGAN
*Director of the United States Patent and Trademark Office*